(12) United States Patent
Delecolle et al.

(10) Patent No.: US 10,202,054 B2
(45) Date of Patent: Feb. 12, 2019

(54) SEAT-BACK TILTING DEVICE

(71) Applicants: RENAULT s.a.s., Boulogne-Billancourt (FR); NISSAN MOTOR CO. LTD, Yokohama-shi (JP)

(72) Inventors: David Delecolle, Avrechy (FR); Gregory Lesueur, Montigny le Bretonneux (FR); Frederic Moulinas, Les Molieres (FR)

(73) Assignees: RENAULT s.a.s., Boulogne-Billancourt (FR); NISSAN MOTOR CO., LTD, Yokohama-shi (JP)

( * ) Notice: Subject to any disclaimer, the term of this patent is extended or adjusted under 35 U.S.C. 154(b) by 447 days.

(21) Appl. No.: 14/412,539

(22) PCT Filed: Jul. 3, 2013

(86) PCT No.: PCT/FR2013/051561
§ 371 (c)(1),
(2) Date: Jan. 2, 2015

(87) PCT Pub. No.: WO2014/006323
PCT Pub. Date: Jan. 9, 2014

(65) Prior Publication Data
US 2015/0191110 A1    Jul. 9, 2015

(30) Foreign Application Priority Data
Jul. 3, 2012   (FR) ...................................... 1256364

(51) Int. Cl.
*B60N 2/22* (2006.01)
*B60N 2/20* (2006.01)
*B60N 2/90* (2018.01)

(52) U.S. Cl.
CPC ................. *B60N 2/22* (2013.01); *B60N 2/20* (2013.01); *B60N 2/933* (2018.02)

(58) Field of Classification Search
CPC ... Y10T 16/459; Y10T 16/46; Y10T 16/4636; Y10T 16/469; Y10T 16/4713;
(Continued)

(56) References Cited

U.S. PATENT DOCUMENTS 2,628,662 A * 2/1953 Morris ................. A47C 1/0244
188/300
3,953,069 A * 4/1976 Tamura .................... B60N 2/20
148/DIG. 136
(Continued)

FOREIGN PATENT DOCUMENTS

DE   23 48 364    4/1975
DE   296 22 601   2/1997
(Continued)

OTHER PUBLICATIONS

International Search Report dated Dec. 4, 2013 in PCT/FR13/051561 Filed Jul. 3, 2012.

*Primary Examiner* — Zakaria Elahmadi
(74) *Attorney, Agent, or Firm* — Oblon, McClelland, Maier & Neustadt, L.L.P.

(57) ABSTRACT

A seat-back tilting device including a tilt control handle that can be selected from a first control handle and a second control handle, and with a tilt control shaft on which the control handle is mounted. The control shaft includes: a zone for receiving a first return member associated with the first control handle; a zone for receiving a second return member associated with the second control handle; and a zone for transmitting forces from the first control handle and from the second control handle.

11 Claims, 2 Drawing Sheets

Figure 5:
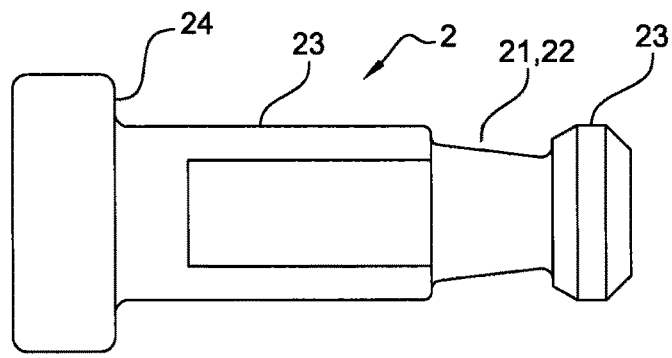

(58) Field of Classification Search
CPC .............. Y10T 16/506; Y10T 16/557; A47B
2095/028; B60N 2/44; B60N 2/442;
B60N 2/4435; B60N 2/10; B60N 2/12;
B60N 2/18; B60N 2/20; B60N 2/22;
B60N 2/2222; B60N 2/2245; B60N
2/3002; B60N 2/43; B60N 2/68; B60N
2002/445; B60N 2002/4455; B60N
2002/446; B60N 2002/684; B60N
2205/30; B60N 2205/50; E05B 1/00;
E05B 1/0007; E05B 1/0015; B25G 1/00;
B25G 3/00; B25G 3/02; B25G 3/04;
B25G 3/06; B25G 3/08; E05D 2005/106
USPC ......... 74/491, 519, 523, 526, 527, 528, 543,
74/546, 551.7, 551.8; 16/110.1, 406, 413,
16/414, 417, 422, 426, 441, DIG. 24;
297/21, 83, 101, 183.7, 300.2, 300.6,
297/301.5, 302.5, 309, 342, 378.14,
297/378.12, 374, 423.33, 452.11, 463.1;
403/17, 33, 163
See application file for complete search history.

(56) References Cited

U.S. PATENT DOCUMENTS

| | | | | |
|---|---|---|---|---|
| 4,188,064 A * | 2/1980 | Cheshire | ............ | B60N 2/2356 297/367 R |
| 4,324,432 A * | 4/1982 | Eldon, III | ............ | A47D 13/105 297/377 |
| 4,387,483 A * | 6/1983 | Larrabee | ............ | E02D 5/801 16/422 |
| 5,216,781 A * | 6/1993 | Brondfield | ............ | E05F 11/10 16/426 |
| 5,282,395 A * | 2/1994 | LaPointe | ............ | A47C 1/034 297/362 |
| 5,390,980 A * | 2/1995 | Premji | ............ | B60N 2/20 297/378.11 |
| 5,425,156 A * | 6/1995 | Strait | ............ | E05F 11/10 16/422 |
| 5,762,278 A * | 6/1998 | Yamaguchi | ............ | A01K 89/006 16/422 |
| 5,910,197 A * | 6/1999 | Chaconas | ............ | B25B 23/0035 81/124.6 |
| 6,009,770 A * | 1/2000 | Och | ............ | B60N 2/22 297/463.1 |
| 6,024,410 A * | 2/2000 | Yoshida | ............ | B60N 2/2358 297/301.1 |
| 6,321,625 B1 * | 11/2001 | Fernandez | ............ | B25B 13/065 81/121.1 |
| 6,782,777 B1 * | 8/2004 | Wei | ............ | B25B 23/0035 81/177.85 |
| 6,860,565 B2 * | 3/2005 | Spence, Jr. | ............ | A47C 31/00 16/DIG. 24 |
| 7,085,375 B2 * | 8/2006 | Katoh | ............ | H04M 1/0216 16/303 |
| 7,296,857 B2 * | 11/2007 | Shinozaki | ............ | B60N 2/2213 297/363 |
| 7,540,536 B2 * | 6/2009 | Hall | ............ | B60R 22/24 280/801.1 |
| 7,828,386 B2 * | 11/2010 | Reubeuze | ............ | B60N 2/2358 297/367 P |
| 2005/0179295 A1 * | 8/2005 | Catanzarite | ............ | A47C 1/025 297/354.1 |
| 2006/0022503 A1 * | 2/2006 | Reubeuze | ............ | B60N 2/2358 297/378.12 |
| 2007/0090674 A1 * | 4/2007 | Miyauchi | ............ | B60N 2/20 297/378.12 |
| 2011/0089736 A1 * | 4/2011 | Seibold | ............ | B60N 2/206 297/367 R |
| 2012/0056460 A1 * | 3/2012 | Baker | ............ | B60N 2/20 297/331 |
| 2012/0280555 A1 * | 11/2012 | Blinzler | ............ | B60N 2/20 297/463.1 |
| 2013/0193731 A1 * | 8/2013 | Morimoto | ............ | B60N 2/682 297/342 |
| 2013/0241253 A1 * | 9/2013 | Harrison | ............ | A47C 1/027 297/258.1 |
| 2013/0285433 A1 * | 10/2013 | Yamada | ............ | B60N 2/995 297/423.3 |
| 2014/0145491 A1 * | 5/2014 | Stilleke | ............ | B21K 23/00 297/463.1 |
| 2015/0151653 A1 * | 6/2015 | Furuta | ............ | B60N 2/68 297/344.15 |
| 2015/0202995 A1 * | 7/2015 | Makita | ............ | B60N 2/20 297/354.12 |
| 2015/0306985 A1 * | 10/2015 | Kimura | ............ | B60N 2/12 297/354.12 |
| 2015/0306990 A1 * | 10/2015 | Nakagawa | ............ | B60N 2/6009 297/452.1 |

FOREIGN PATENT DOCUMENTS

FR  2 776 585  10/1999
WO  97/20706   6/1997

* cited by examiner

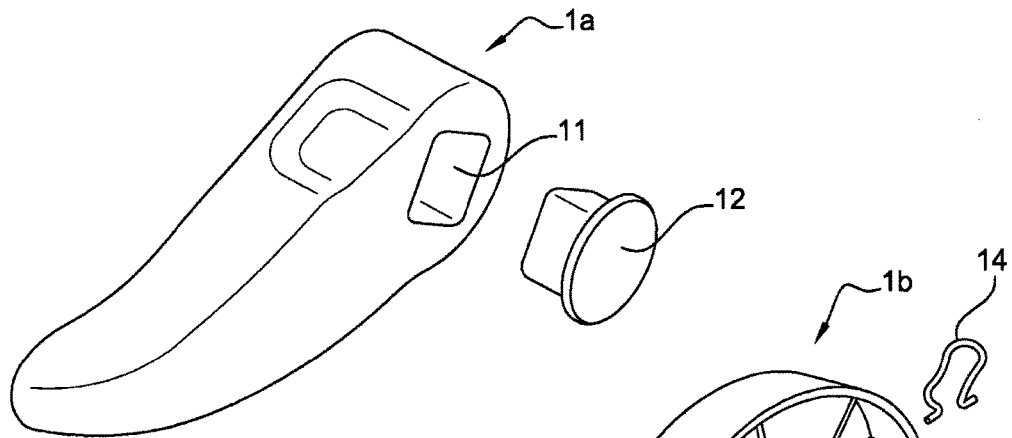
Fig. 1
Fig. 2
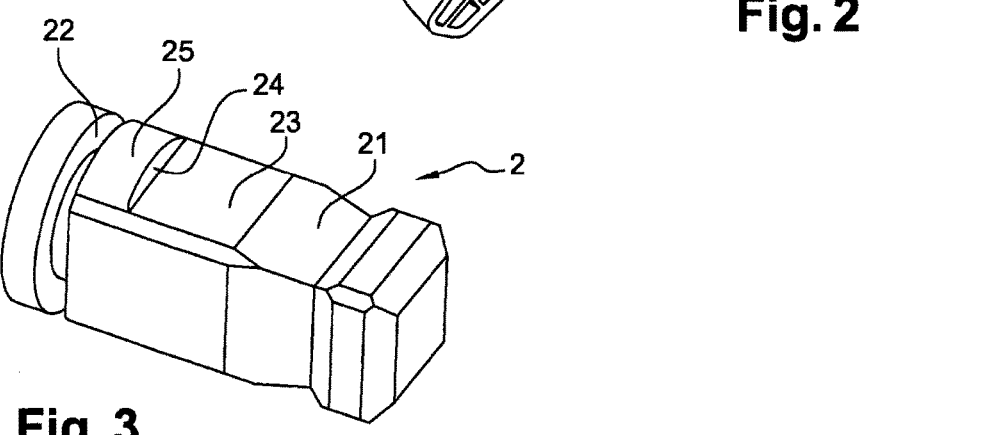
Fig. 3
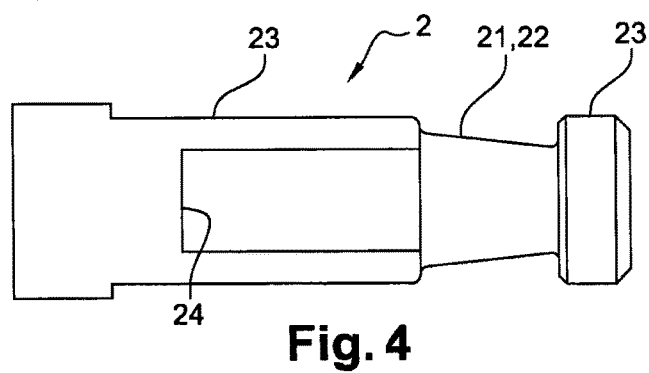
Fig. 4

SEAT-BACK TILTING DEVICE

The object of the present invention is a seat-back tilting device for a motor vehicle.

In motor vehicles, the seats and in particular the front seats are usually equipped with a seat-back tilting device. This tilting device allows the seat to pivot from a starting position to a position in which the seat is tilted.

The tilt of the seat is adjusted using a tilting device which typically comprises a tilt control handle, also called an operating handle or lever, which allows the seat tilt to be adjusted and which is fixed to a control shaft able to transmit the movement from the handle to a seat pivot shaft.

Two types of control handle are known. A first control handle 1a, as illustrated in FIG. 1, is fitted with an opening 11 which is for example square or rectangular in section. The opening 11 allows the handle 1a to slide into the tilt control shaft. Return members for the handle 1a are arranged inside the opening 11 and allow the handle 1a to be fixed to the control shaft. A seal 12 prevents the handle 1a from coming loose.

A second example of a control handle 1b, as illustrated in FIG. 2, comprises a groove 13 intended to receive a spring 14 allowing the handle 1b to be fixed to the control shaft and preventing it from coming loose.

The use of these two types of handles involves the use of two separate tilt control shafts, which makes installation of the adjustment device complex and costly.

The present invention proposes to remedy these drawbacks.

In particular it proposes a seat-back tilting device comprising a tilt control shaft which is adapted to both types of handle.

The object of the invention is therefore a seat-back tilting device comprising a tilt control handle which can be selected from a first control handle and a second control handle, and a tilt control shaft on which the control handle is mounted.

In the device according to the invention, the control shaft comprises:
  a zone for receiving a first return member associated with the first control handle,
  a zone for receiving a second return member associated with the second control handle, and
  a zone for transmitting forces from the first control handle and from the second control handle.

The zone for receiving the first return member and the zone for receiving the second return member may be separate.

The zone for receiving the first return member and the zone for receiving the second return member may be coincident.

The zone for transmitting forces from the first control handle and from the second control handle may be of rectangular or square section.

The control shaft may also comprise a stop for blocking the control handles longitudinally.

The control shaft may comprise a polarization system.

The polarization system may be created by the use of different dimensions for the faces of the control shaft.

The polarization system may be created by means of a rib on the control shaft intended to receive a finger of a control handle.

The return member associated with the first control handle may form an integral part of the first control handle, the first control handle comprising a seal, and the return member associated with the second control handle may be a member which is separate from the second control handle.

The object of the invention is furthermore the use of the device described above for tilting the seat-back of the seat of a motor vehicle.

The object of the invention is also a tilt kit comprising:
  a tilting device described below, equipped with a first tilt control,
  a tilting device described below, equipped with a second tilt control.

Figure 6:
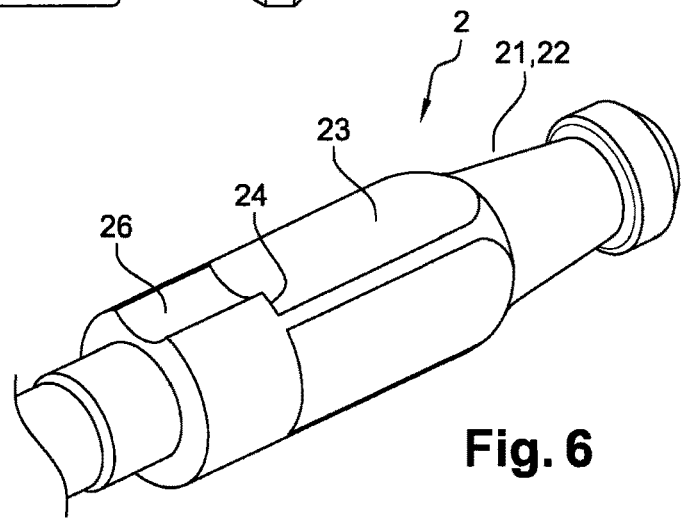
Figure 7:
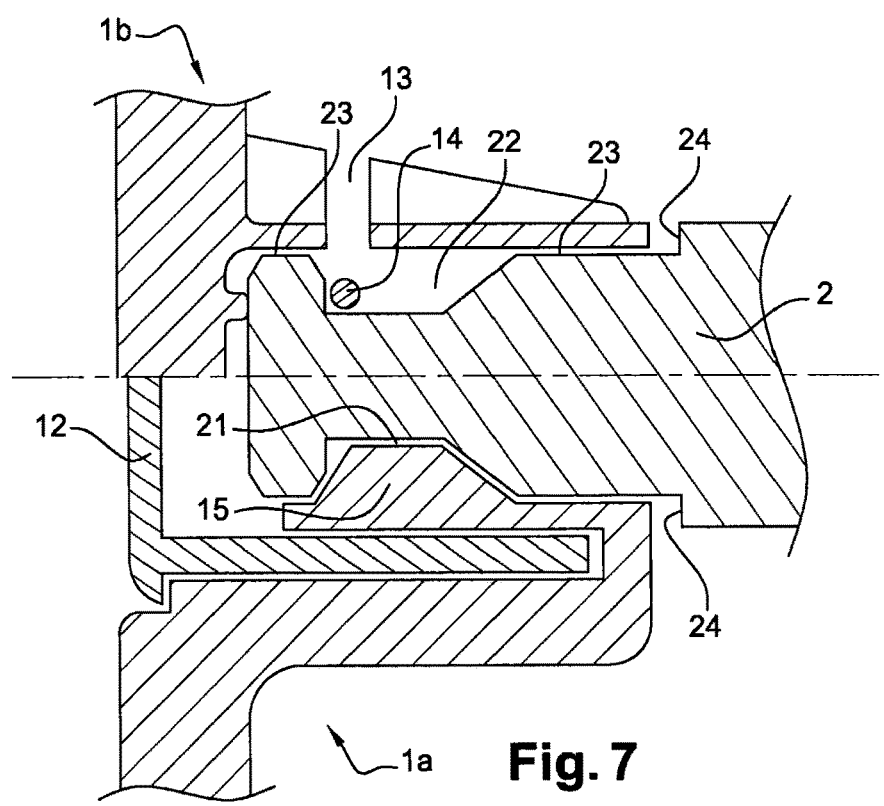

Further characteristics and advantages of the present invention will appear more clearly from reading the description below, given as an illustrative example without limitation and with reference to the attached figures on which:

FIG. 1 (already described) illustrates a first type of control handle which may be used in a device according to the invention, FIG. 2 (already described) illustrates a second type of control handle which may be used in a device according to the invention, FIG. 3 shows part of a device according to the invention according to a first embodiment, FIG. 4 shows part of a device according to the invention according to a second embodiment, FIG. 5 shows part of a device according to the invention according to a third embodiment, FIG. 6 shows part of a device according to the invention according to a fourth embodiment, and FIG. 7 is a cross-section view of two devices according to the invention.

As illustrated in FIG. 3, the tilt control shaft 2 according to the invention has a zone 21 for receiving a return member of a first control handle 1a shown in FIG. 1, a zone 22 for receiving a return member of the second control handle 1b shown in FIG. 2, a force transmission zone 23 and a stop 24 intended for blocking the control handles 1a, 1b longitudinally.

The return members 14 and 15 are intended to fix the control handles 1b and 1a to the shaft of the tilt control 2, the first return member 15 being associated with the first control handle 1a and intended to fix the first control handle 1a to the tilt control shaft 2, and the second return member 14 being associated with the second control handle 1b and intended to fix the second control handle 1b to the tilt control shaft 2.

The control shaft 2 may be globally parallelepipedic in form with a rectangular or square section.

The reception zone 21 may take the form of a hollow, for example a dish, in particular of U or V shape. The reception zone 22 may take the form of a rib. The force transmission zone 23 is a zone intended to transmit force from each control handle 1a, 1b to the control shaft 2.

The device also comprises a polarization system to prevent a handle 1a, 1b from being mounted with an incorrect angular orientation. The polarization system may be created by the use of different dimensions for the faces of the control shaft 2. Also the polarization system may be created by means of a zone 25 protruding from one of the faces of the control shaft 22, wherein the protruding zone 25 may for example have a circular outer surface. The protruding zone 25 also defines a stop 24 in translation along the control shaft 2 for the control handles 1a, 1b.

In a second embodiment, as shown in FIG. 4, in which elements identical to those in FIG. 3 carry the same references, the control shaft 2 comprises a single zone 21, 22 for receiving the return member for both control handles 1a, 1b. This reception zone 21, 22 is a rib which can receive both return members for handles 1a, 1b. The control shaft 2 also comprises a two-part force transmission zone 23, on both sides of the zone 21, 22 for receiving the return member. The control shaft 2 also comprises a polarization system created by the use of different dimensions for the faces of the control shaft 2.

A third embodiment, illustrated in FIG. 5, in which elements identical to those in FIG. 4 carry the same references, is similar to the second embodiment apart from the fact that the control shaft 2 comprises a more defined stop 24 arranged in the extension of the force transmission zone 23.

Finally, in a fourth embodiment as illustrated in FIG. 6, the control shaft 2 comprises a rib 26 intended to receive a finger of a control handle 1a, 1b and constituting the polarization system. This system differs from the first three embodiments in which the polarization system is created by different dimensions of the faces of the control shaft 2.

FIG. 7 in its lower part illustrates the first control handle 1a installed on the control shaft 2, while the upper part shows the second control handle 1b installed on the control shaft 2.

The first control handle 1a comprises a return member 15 which exerts an upward thrust in the direction of the control shaft 2. The seal 12 prevents the handle 1a from coming loose.

In the case of the second control handle 1b, the return member 14 does not belong to the control handle 1b. The return member 14 allows the handle 1b to be fixed to the control shaft 2 and prevents it from coming loose.

Also the invention concerns a tilt kit composed of two tilting devices, one equipped with a first tilt control 1a and the other equipped with a second tilt control 1b, the tilt kit thus comprising two tilt controls 1a and 1b and at least one control shaft 2.

It should also be noted that the device according to the invention may also be used in other types of rotary controls.

The invention claimed is:

1. A seat-back tilting device comprising:
   a tilt control handle that is selected from a group comprising a first tilt control handle and a second tilt control handle, the first tilt control handle and the second tilt control handle being shaped differently from one another; and
   a tilt control shaft on which the first tilt control handle is mountable and on which the second tilt control handle is mountable, the tilt control shaft comprising:
      a first zone in which a first return member that is part of the first tilt control handle is receivable and in which a second return member that is part of the second tilt control handle is receivable, and
      a second zone that is in contact with any one of the first tilt control handle and the second tilt control handle to transmit forces from any one of the first tilt control handle and the second tilt control handle,
   wherein the first return member forms an integral part of the first tilt control handle, the first tilt control handle comprising a seal, and the second return member is a member which is separate from the second tilt control handle.

2. The device as claimed in claim 1, wherein the second zone is of rectangular or square section.

3. The device as claimed in claim 1, wherein the tilt control shaft further comprises a stop to block the tilt control handle longitudinally.

4. The device as claimed in claim 1, wherein the device is used to tilt the seat-back of a seat of a motor vehicle.

5. A tilt kit comprising:
   first and second tilting devices as claimed in claim 1 operatively connected with one another.

6. A seat-back tilting device comprising:
   a tilt control handle that is selected from a group comprising a first tilt control handle and a second tilt control handle, the first tilt control handle and the second tilt control handle being shaped differently from one another; and
   a tilt control shaft on which the first tilt control handle is mountable and on which the second tilt control handle is mountable, only one of the first tilt control handle and the second tilt control handle mounted on the tilt control shaft, the tilt control shaft comprising:
      a first zone in which a first return member that is part of the first tilt control handle is receivable and in which a second return member that is part of the second tilt control handle is receivable, and
      a second zone that is in contact with any one of the first tilt control handle and the second tilt control handle to transmit forces from any one of the first tilt control handle and the second tilt control handle,
   wherein the first return member forms an integral part of the first tilt control handle, and the second return member is a member which is separate from the second tilt control handle.

7. The device as claimed in claim 6, wherein the first tilt control handle comprises a seal.

8. The device as claimed in claim 6, wherein the second zone is of rectangular or square section.

9. The device as claimed in claim 6, wherein the tilt control shaft further comprises a stop to block the tilt control handle longitudinally.

10. The device as claimed in claim 6, wherein the device is used to tilt the seat-back of a seat of a motor vehicle.

11. A tilt kit comprising:
    first and second tilting devices as claimed in claim 6 operatively connected with one another.

* * * * *